(12) United States Patent
Ohashi

(10) Patent No.: US 11,008,347 B2
(45) Date of Patent: May 18, 2021

(54) METAL-ORGANIC FRAMEWORK AND METHOD OF PRODUCING THE SAME

(71) Applicant: TOYOTA JIDOSHA KABUSHIKI KAISHA, Toyota (JP)

(72) Inventor: Yoshio Ohashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/229,689

(22) Filed: Dec. 21, 2018

(65) Prior Publication Data

US 2019/0194232 A1 Jun. 27, 2019

(30) Foreign Application Priority Data

Dec. 27, 2017 (JP) .............................. JP2017-250893
Sep. 26, 2018 (JP) .............................. JP2018-180815

(51) Int. Cl.
*C07F 7/00* (2006.01)
*B01D 53/26* (2006.01)
*B01J 20/22* (2006.01)

(52) U.S. Cl.
CPC ............ *C07F 7/003* (2013.01); *B01D 53/261* (2013.01); *B01J 20/226* (2013.01); *B01D 2253/204* (2013.01); *B01D 2253/306* (2013.01); *B01D 2253/31* (2013.01); *B01D 2253/311* (2013.01); *B01D 2255/2065* (2013.01); *B01D 2255/20715* (2013.01)

(58) Field of Classification Search
None
See application file for complete search history.

(56) References Cited

U.S. PATENT DOCUMENTS

2017/0008915 A1* 1/2017 Yaghi .................. B01D 53/047

FOREIGN PATENT DOCUMENTS

| CN | 106029674 A | 10/2016 |
|---|---|---|
| WO | 2015/127033 A1 | 8/2015 |

OTHER PUBLICATIONS

H. Furukawa et al. "Water adsorption in porous metal-organic frameworks and related materials", J. Am. Chem. Soc. 2014, 136, 4369-4381.
Zhelan Fang et al.: "Structural Complexity in Metal-Organic Frameworks: Simultaneous Modification of Open Metal Sites and Hierarchical Porosity by Systematic Doping with Defective Linkers" Journal of the American Chemical Society, 136 (27), pp. 9627-9636, Jun. 10, 2014.

* cited by examiner

*Primary Examiner* — Clinton A Brooks
(74) *Attorney, Agent, or Firm* — Sughrue Mion, PLLC

(57) ABSTRACT

A metal-organic framework of the present disclosure includes tetravalent Group IV element ions or rare earth ions as metal ions, first ions of organic molecules having a trimesic acid framework as tridentate ligands, and second ions of organic molecules having a heterocycle and two carboxy groups as bidentate ligands.

10 Claims, 15 Drawing Sheets

RELATED ART

COMPARATIVE EXAMPLE

COMPARATIVE EXAMPLE

METAL-ORGANIC FRAMEWORK AND METHOD OF PRODUCING THE SAME

INCORPORATION BY REFERENCE

The disclosure of Japanese Patent Application No. 2018-180815 filed on Sep. 26, 2018 including the specification, drawings and abstract is incorporated herein by reference in its entirety.

BACKGROUND

1. Technical Field

The present disclosure discloses a metal-organic framework and a method of producing the same.

2. Description of Related Art

In recent years, research and development on metal-organic frameworks (hereinafter referred to as an "MOF") which are porous compounds for a material having functions such as gas storage and separation has been conducted.

As a technique related to an MOF, an MOF (MOF-808) including $Zr^{4+}$ as a metal ion, a trimesic acid ion as a multidentate ligand, and a formate ion as a monodentate ligand is disclosed in, for example, H. Furukawa et al. "Water adsorption in porous metal-organic frameworks and related materials" J. Am. Chem. Soc. 2014, 136, 4369-4381.

SUMMARY

There is a concern that, if an adsorption humidity of an MOF increases, when a relative humidity is low, the MOF is unlikely to adsorb water vapor, which causes a decrease in an adsorption amount of the MOF. For example, in H. Furukawa et al. "Water adsorption in porous metal-organic frameworks and related materials" J. Am. Chem. Soc. 2014, 136, 4369-4381, it is described that an MOF exhibits characteristics of adsorbing and desorbing water vapor according to a change in the relative humidity.

Here, the present disclosure provides a metal-organic framework through which an amount of water vapor adsorption increases while a water vapor adsorption humidity is reduced and a method of producing the same.

A first aspect of the present disclosure is a metal-organic framework that includes tetravalent Group IV element ions or rare earth ions as metal ions, first ions of organic molecules having a trimesic acid framework as tridentate ligands, and second ions of organic molecules having a heterocycle and two carboxy groups as bidentate ligands.

In the first aspect, the metal ions may be at least one selected from the group consisting of $Zr^{4+}$, $Hf^{4+}$ and $Ce^{4+}$.

In the first aspect, the metal ions may be $Zr^{4+}$.

In the first aspect, the first ions may be trimesic acid ions ($BTC^{3-}$).

In the first aspect, the total ion charge of the second ion may be −2 or more.

In the first aspect, the bidentate ligands may have a structure represented by the following General Formula (1) and at least one of $X_1$ and $X_2$ in the following General Formula (1) may be a Group 15 element or a Group 16 element.

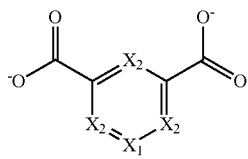

In the first aspect, the bidentate ligands may be at least one selected from the group consisting of 3,5-pyridinedicarboxylic acid ions (3,5-$PyDC^{2-}$), 2,4-pyridinedicarboxylic acid ions (2,4-$PyDC^{2-}$), 2,6-pyridinedicarboxylic acid ions (2,6-$PyDC^{2-}$), 4-hydroxypyridine-2,6-dicarboxylic acid ions (chelidamic acid ions), and 4-oxo-4H pyran-2,6-dicarboxylic acid ions (chelidonic acid ions).

In the first aspect, the bidentate ligands may be 3,5-pyridinedicarboxylic acid ions (3,5-$PyDC^{2-}$).

A second aspect of the present disclosure is a method of producing a metal-organic framework that includes heating a solution containing a metal ion source including tetravalent Group IV element ions or rare earth ions, first organic molecules having a trimesic acid framework or first salts having the trimesic acid framework, second organic molecules having a heterocycle and two carboxy groups or second salts having the heterocycle and the two carboxy groups, and a solvent.

In the second aspect, the metal ion source may be at least one selected from the group consisting of zirconium compounds, hafnium compounds and cerium compounds.

In the second aspect, the metal ion source may be a zirconium compound.

In the second aspect, the zirconium compound may include zirconium oxychloride octahydrate ($ZrOCl_2 \cdot 8H_2O$) or zirconium chloride ($ZrCl_4$).

In the second aspect, the first organic molecules may be trimesic acid ($H_3BTC$).

In the second aspect, the second organic molecules or the second salts may not have a functional group having a smaller pKa than a pKa (acid dissociation constant) of the carboxy group.

In the second aspect, the second organic molecules or the second salts may have a structure represented by the following General Formula (1) and at least one of $X_1$ and $X_2$ in the following General Formula (1) may be a Group 15 element or a Group 16 element.

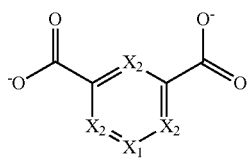

In the second aspect, the second organic molecules or the second salts may be at least one selected from the group consisting of 3,5-pyridinedicarboxylic acid ions (3,5-$PyDC^{2-}$), 2,4-pyridinedicarboxylic acid ions (2,4-$PyDC^{2-}$), 2,6-pyridinedicarboxylic acid ions (2,6-$PyDC^{2-}$), 4-hydroxypyridine-2,6-dicarboxylic acid ions (chelidamic acid ions), and 4-oxo-4H pyran-2,6-dicarboxylic acid ions (chelidonic acid ions).

In the second aspect, the second organic molecules or second salts may be 3,5-pyridinedicarboxylic acid ions (3,5-$PyDC^{2-}$).

In the second aspect, a proportion of the second organic molecules or the second salts with respect to a total amount of the first organic molecules or the first salts and the second organic molecules or the second salts may be 70 mol % or less.

In the second aspect, the solvent may include an amide and a carboxylic acid.

In the second aspect, the amide may include N,N-dimethylformamide (DMF) or N,N-diethylformamide (DEF).

In the second aspect, the carboxylic acid may be a monovalent linear saturated aliphatic carboxylic acid having one to three carbon atoms.

In the second aspect, the carboxylic acid may include formic acid or acetic acid.

According to the present disclosure, it is possible to provide a metal-organic framework through which an amount of water vapor adsorption increases while a water vapor adsorption humidity is reduced and a method of producing the same.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The present disclosure will be described below with reference to the drawings. Here, the forms shown below are examples of the present disclosure, and the present disclosure is not limited to the following forms.

1. Metal-Organic Framework (MOF)

A first aspect of the present disclosure is a metal-organic framework (MOF) that includes tetravalent Group IV element ions or rare earth ions as metal ions, ions of organic molecules having a trimesic acid framework as tridentate ligands (first ions), and ions of organic molecules having a heterocycle and two carboxy groups as bidentate ligands (second ions).

Figure 1:
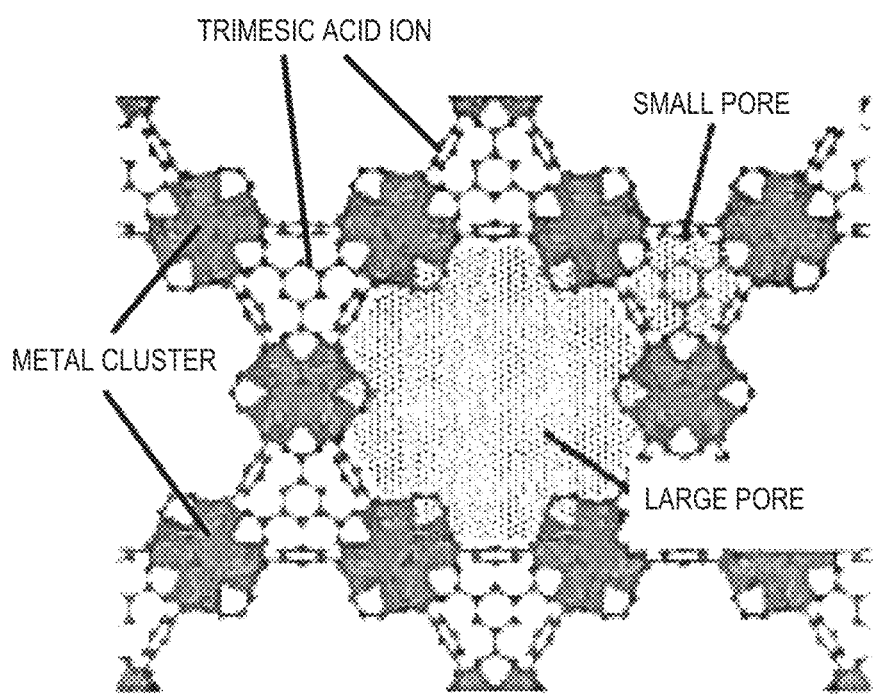
FIG. 1 is a diagram showing a crystal structure of an MOF (MOF-808) according to the related art.
Figure 2:
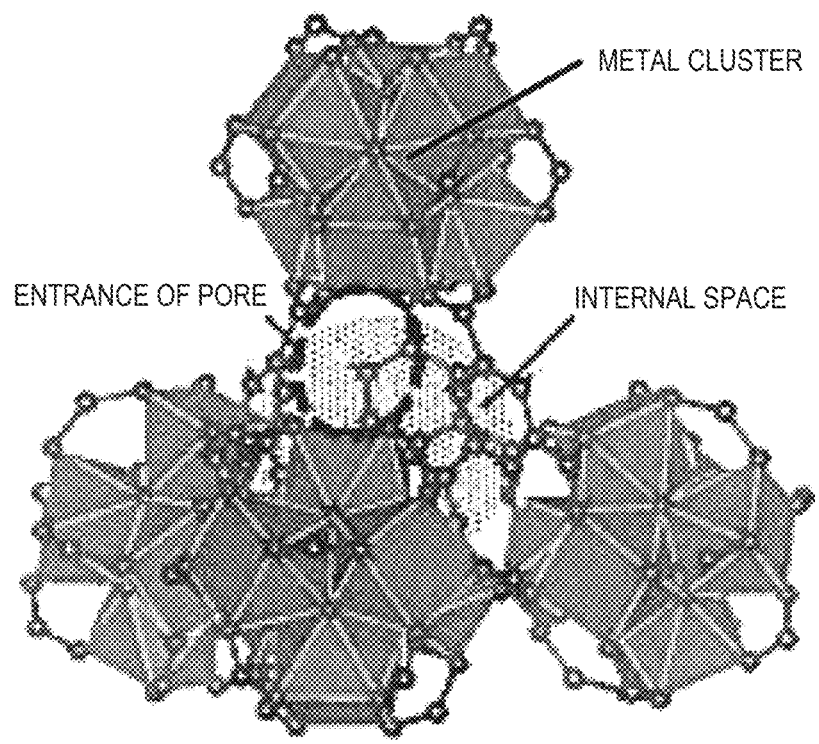
FIG. 2 is a diagram with a focus on cage forming small pores in a crystal structure of the MOF according to the related art.
Figure 3:
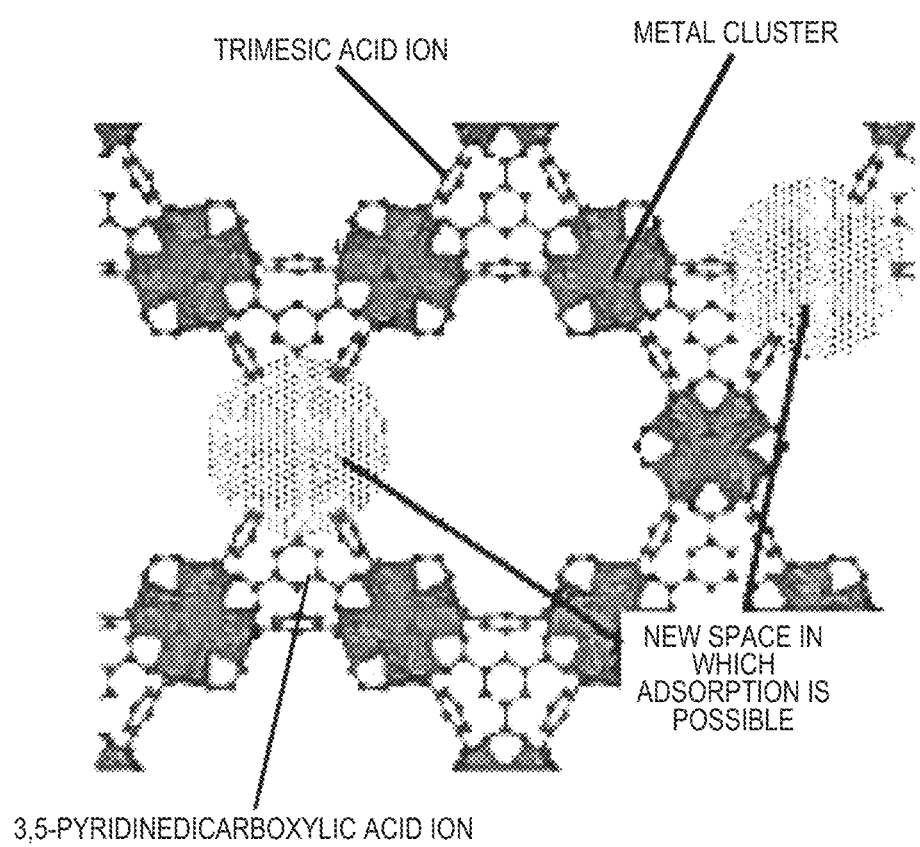
FIG. 3 is a diagram showing a crystal structure of an example of an MOF of the present disclosure and is a diagram corresponding to FIG. 1.
Figure 4:
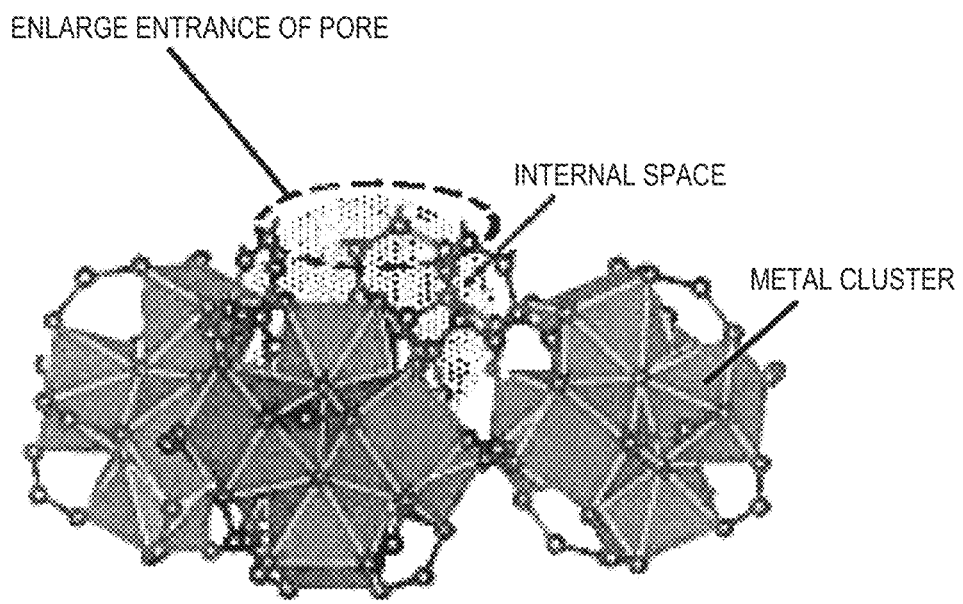
FIG. 4 is a diagram explaining cage into which defects are introduced among crystal structures of an example of the MOF of the present disclosure and is a diagram corresponding to FIG. 2.

According to the MOF of the present disclosure, it is possible to increase a water vapor adsorption amount while an increase in the water vapor adsorption humidity is reduced compared to MOFs according to the related art. The reason for this presumption will be described with reference to FIGS. 1 to 4. FIGS. 1 and 2 are diagrams explaining a crystal structure of MOF-808 according to the related art. FIGS. 3 and 4 are diagrams explaining a crystal structure of an example of the MOF according to the present disclosure. FIGS. 1 and 2 correspond to FIGS. 3 and 4.

FIG. 1 is a diagram showing a crystal structure of an MOF (MOF-808) according to the related art. As shown in FIG. 1, the MOF according to the related art has a three-dimensional structure in which metal clusters including $Zr^{4+}$ (in the example shown in FIGS. 1 and 2, $Zr_6O_4(OH)_4(-CO_2)_6$) which are secondary building units (SBU) are linked by ions of organic molecules having a trimesic acid framework (tridentate ligands, in the example shown in FIGS. 1 and 2, trimesic acid ions) which are organic linkers, and includes two types of pore (large pores and small pores) with different sizes.

FIG. 2 is a diagram with a focus on cage forming small pores within the crystal structure of the MOF according to the related art. As shown in FIG. 2, small pores are formed inside a tetrahedral cage formed by connecting trimesic acid ions so that four metal clusters are located at vertices of the tetrahedron. As shown in FIG. 2, the entrance of small pores has a narrower structure (so-called ink bottle structure) than an internal space.

On the other hand, in the MOF of the present disclosure, some of ions of organic molecules having a trimesic acid framework (tridentate ligands, in the example shown in FIGS. 3 and 4, trimesic acid ions) are substituted with ions of organic molecules having a heterocycle and two carboxy groups (bidentate ligands, in the example shown in FIGS. 3 and 4, 3,5-pyridinedicarboxylic acid ions), and thus the number of functional groups coordinated to metal ions and a negative charge are insufficient, and for charge compensation, as exemplified in FIGS. 3 and 4, it is thought that defects are introduced into the structure of the MOF. Therefore, it is assumed that a new space in which adsorption is possible is larger or a framework density decreases, and thus the weight is reduced so that a water vapor adsorption amount increases.

According to the MOF of the present disclosure, it is possible to decrease a water vapor adsorption humidity (adsorption humidity). The reason for this presumption will be described with reference to FIGS. 5 and 6. Here, in the present disclosure, the adsorption humidity is a value indicating a relative humidity at which the water vapor adsorption amount reaches half, and the relative humidity is a value indicating a ratio of an amount of water vapor contained in air to a saturated water vapor amount of air at a certain temperature.

Figure 5:
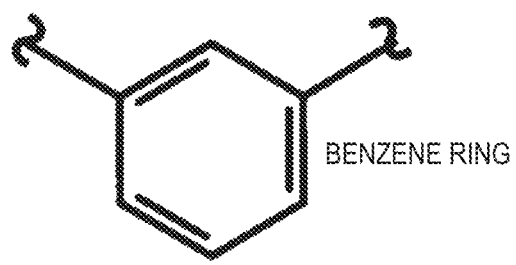
FIG. 5 is an example showing an interaction between a pore surface of an MOF according to a comparative example and a water molecule.
Figure 5:

FIG. 5 is a diagram of an example showing an interaction between a pore surface of an MOF of a comparative example substituted with a bidentate ligand having a benzene ring and a water molecule. In the case of the comparative example, it is thought that a bidentate ligand having a hydrophobic benzene ring having little interaction with water molecules is introduced, the bidentate ligand is present on the surface of pores, and thus water molecules are unlikely to be attracted to the benzene ring, and the water vapor adsorption humidity increases.

Figure 6:
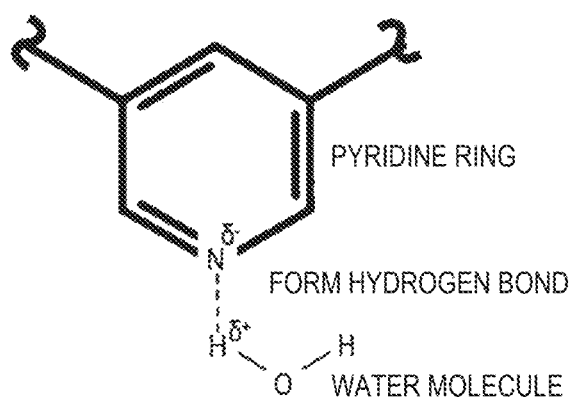
FIG. 6 is an example showing an interaction between a pore surface of an MOF of an example and a water molecule.

On the other hand, as shown in FIG. 6, in the MOF of the present disclosure, substitution of ions of organic molecules having a heterocycle and two carboxy groups (bidentate ligands, in the example shown in FIG. 6, a heterocycle is a pyridine ring) occurs, and the bidentate ligand is present on the surface of pores. Since the heterocycle includes atoms having large electronegativity (nitrogen, oxygen, sulfur, selenium, tellurium), electrons of hydrogen atoms of water molecules are strongly attracted to the atoms having large electronegativity. As a result, it is thought that the state of hydrogen atoms is close to that of protons, and bonds (hydrogen bonds) are formed between hydrogen atoms and atoms having large electronegativity. Therefore, it is assumed that water molecules are attracted to the heterocycle, and the water vapor adsorption humidity can decrease.

When organic molecules having a heterocycle and two carboxy groups are used as bidentate ligands, even if an amount of bidentate ligands added is high, it is possible to reduce a decrease in the water vapor adsorption amount. The reason for this presumption will be described with reference to FIGS. 7 to 9.

Figure 7:
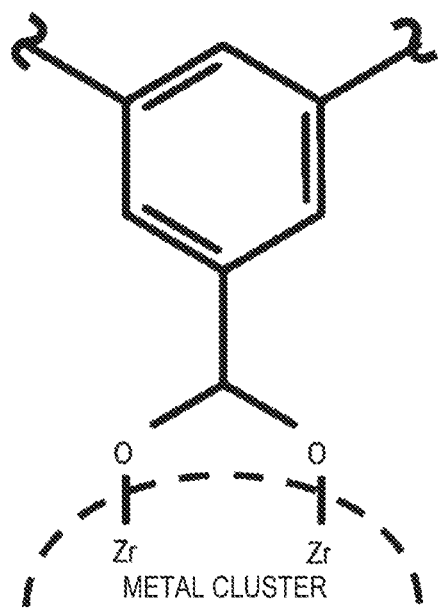
FIG. 7 is an example showing an interaction between a tridentate ligand and a metal cluster.
Figure 8:
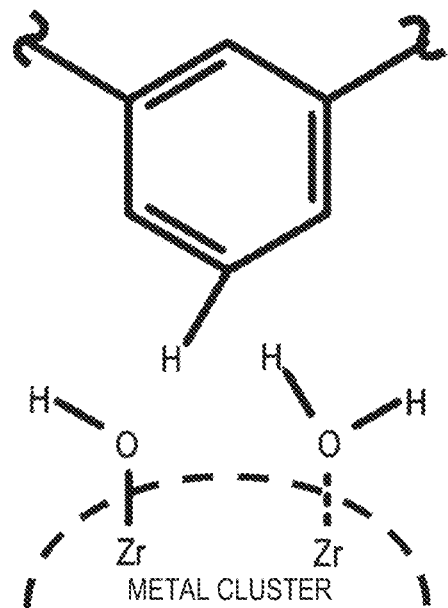
FIG. 8 is an example showing an interaction between a bidentate ligand having a benzene ring and a metal cluster.

FIG. 7 is a diagram of an example showing an interaction between a tridentate ligand and a metal cluster. Generally, the metal cluster is bonded by a tridentate ligand and a carboxy group. On the other hand, it is thought that, when the metal cluster is not bonded to a carboxy group, Zr on the surface of metal clusters is bonded to a hydroxy group or water molecules. As shown in FIG. 8, when the bidentate ligand having a benzene ring is present in the vicinity of the metal cluster, since hydrogen atoms that extend in a direction of the metal cluster from the benzene ring are present, the steric hindrance is large and destabilization of the structure occurs. Therefore, it is thought that, when an amount of bidentate ligands having a benzene ring added is high, the water vapor adsorption amount decreases.

Figure 9:
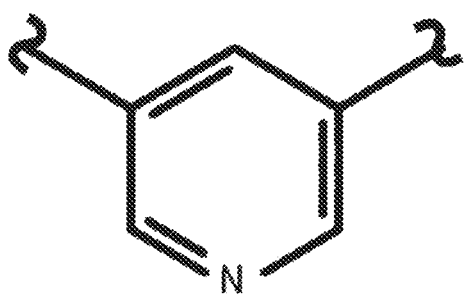
FIG. 9 is an example showing an interaction between a bidentate ligand having a heterocycle and a metal cluster.
Figure 9:
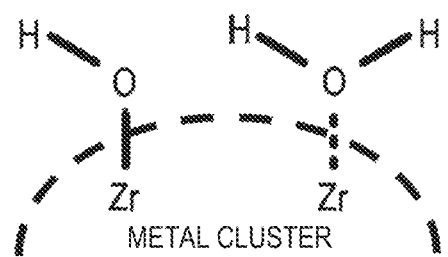

On the other hand, as shown in FIG. 9, when a bidentate ligand having a heterocycle is present in the vicinity of the metal cluster, since there are no hydrogen atoms that extend in a direction of the metal cluster and the like, the steric hindrance is small and destabilization of the structure is reduced. Therefore, it is thought that, even if an amount of bidentate ligands having a heterocycle added is high, it is possible to reduce a decrease in the water vapor adsorption amount. Hereinafter, components constituting the MOF of the present disclosure will be described in order.

1.1. Metal Ions

The MOF of the present disclosure includes tetravalent Group IV element ions or rare earth ions as metal ions. In order to obtain a crystal structure of the MOF of the present disclosure, metal ions need to be tetravalent. Examples of tetravalent Group IV element ions include $Ti^{4+}$, $Zr^{4+}$ and $Hf^{4+}$. Examples of tetravalent rare earth ions include $Ce^{4+}$, $Pr^{4+}$, $Tb^{4+}$, and $Dy^{4+}$. The MOF of the present disclosure may include metal ions of a plurality of types among the tetravalent Group IV element ions or rare earth ions exemplified above. Among these, in order to form a metal cluster which is a secondary building unit (SBU) of the MOF, 8-coordination to oxide ions ($O^{2-}$) is necessary. Therefore, an ion having a large ionic radius is suitable, and in consideration of ease of availability, stability of tetravalent ions, and the like, at least one ion selected from the group consisting of $Zr^{4+}$, $Hf^{4+}$ and $Ce^{4+}$ is preferable, and $Zr^{4+}$ is more preferable.

1.2. Bidentate Ligand

The MOF of the present disclosure includes ions of organic molecules having a heterocycle and two carboxy groups as bidentate ligands.

1.2.1. Ions of Organic Molecules having a Heterocycle and Two Carboxy Groups

Ions of organic molecules having a heterocycle and two carboxy groups mean, for example, ions having a structure represented by the following General Formula (1). The heterocycle in the present disclosure means a cyclic organic compound including a heteroatom having a lone pair of electrons such as nitrogen, oxygen, and sulfur.

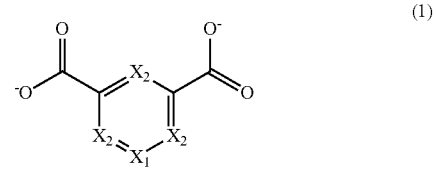

(1)

In General Formula (1), $X_1$ and $X_2$ indicate elements constituting a ring. $X_1$ and $X_2$ are not particularly limited as long as the ions function as organic linkers and can form the MOF of the present disclosure. A case in which at least one of $X_1$ and $X_2$ is a Group 15 element or a Group 16 element may be exemplified. Here, when $X_1$ or $X_2$ is not a Group 15 element or a Group 16 element, a case in which $X_1$ or $X_2$ is a Group 14 element such as carbon may be exemplified.

The heterocycle of ions of the organic molecule is not particularly limited as long as the ions having the heterocycle function as organic linkers, and can form the MOF of the present disclosure. However, as a specific example of the heterocycle, at least one selected from the group consisting of a pyran ring, a pyridine ring, a pyrimidine ring, a pyrazine ring, a pyridazine ring, a dioxin ring, a triazine ring, a tetrazine ring, an oxazine ring, and a thiazine ring may be exemplified.

For ions of organic molecules having a heterocycle and two carboxy groups, the total charge of ion needs to be −2 or more. This is because it is thought that, when the total charge of ion of organic molecule having a heterocycle and two carboxy groups is −3 or less, since the charge of ions of organic molecules having a trimesic acid framework substituted is −3, charge compensation is not necessary, and defect introduction (defects of metal ions having a positive charge) does not occur.

As specific examples of ions of organic molecules having the above structure and having a heterocycle and two carboxy groups that can constitute the MOF of the present disclosure, at least one selected from the group consisting of 3,5-pyridinedicarboxylic acid ions (3,5-PyDC$^{2-}$), 2,4-pyridinedicarboxylic acid ions (2,4-PyDC$^{2-}$), 2,6-pyridinedicarboxylic acid ions (2,6-PyDC$^{2-}$), 4-hydroxypyridine-2,6-dicarboxylic acid ions (chelidamic acid ions), and 4-oxo-4H pyran-2,6-dicarboxylic acid ions (chelidonic acid ions) may be exemplified. Among these, 3,5-pyridinedicarboxylic acid ions (3,5-PyDC$^{2-}$) are preferable.

1.3. Tridentate Ligand

The MOF of the present disclosure includes ions of organic molecules having a trimesic acid framework as tridentate ligands.

1.3.1. Ions of Organic Molecules having a Trimesic Acid Framework

Ions of organic molecules having a trimesic acid framework mean, for example, ions having a structure represented by the following General Formula (2).

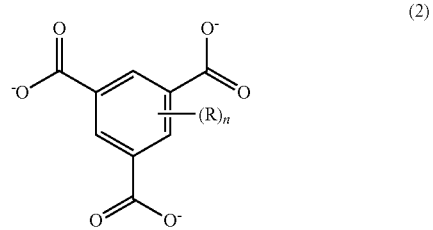

(2)

In General Formula (2), R is a substituent, and n is a natural number of 1 to 3. The substituent R is not particularly limited as long as it can form the MOF of the present disclosure. For example, a hydroxy group, a nitro group, a fluoro group, a chloro group, a bromo group, an iodo group, a methyl group, an ethyl group, and a tert-butyl group may be exemplified.

As specific examples of ions of organic molecules having the above structure and having a trimesic acid framework that can constitute the MOF of the present disclosure, at least one selected from the group consisting of trimesic acid ions (BTC$^{3-}$), 2-hydroxy-1,3,5-benzenetricarboxylic acid ions, 2-nitro-1,3,5-benzenetricarboxylic acid ions, 2-chloro-1,3,5-benzenetricarboxylic acid ions, 2-bromo-1,3,5-benzenetricarboxylic acid ions, and 2-methyl-1,3,5-benzenetricarboxylic acid ions may be exemplified. Among these, trimesic acid ions (BTC$^{3-}$) are preferable.

2. Method of Producing Metal-Organic Framework (MOF)

A method of producing a metal-organic framework (MOF) of the present disclosure is a method of producing a metal-organic framework (MOF) including a process of heating a solution containing a metal ion source including tetravalent Group IV element ions or rare earth ions, organic molecules having a trimesic acid framework (first organic molecules) or salts thereof (second salts), organic molecules having a heterocycle and two carboxy groups (second organic molecules) or salts thereof (second salts), and a solvent.

Figure 10:
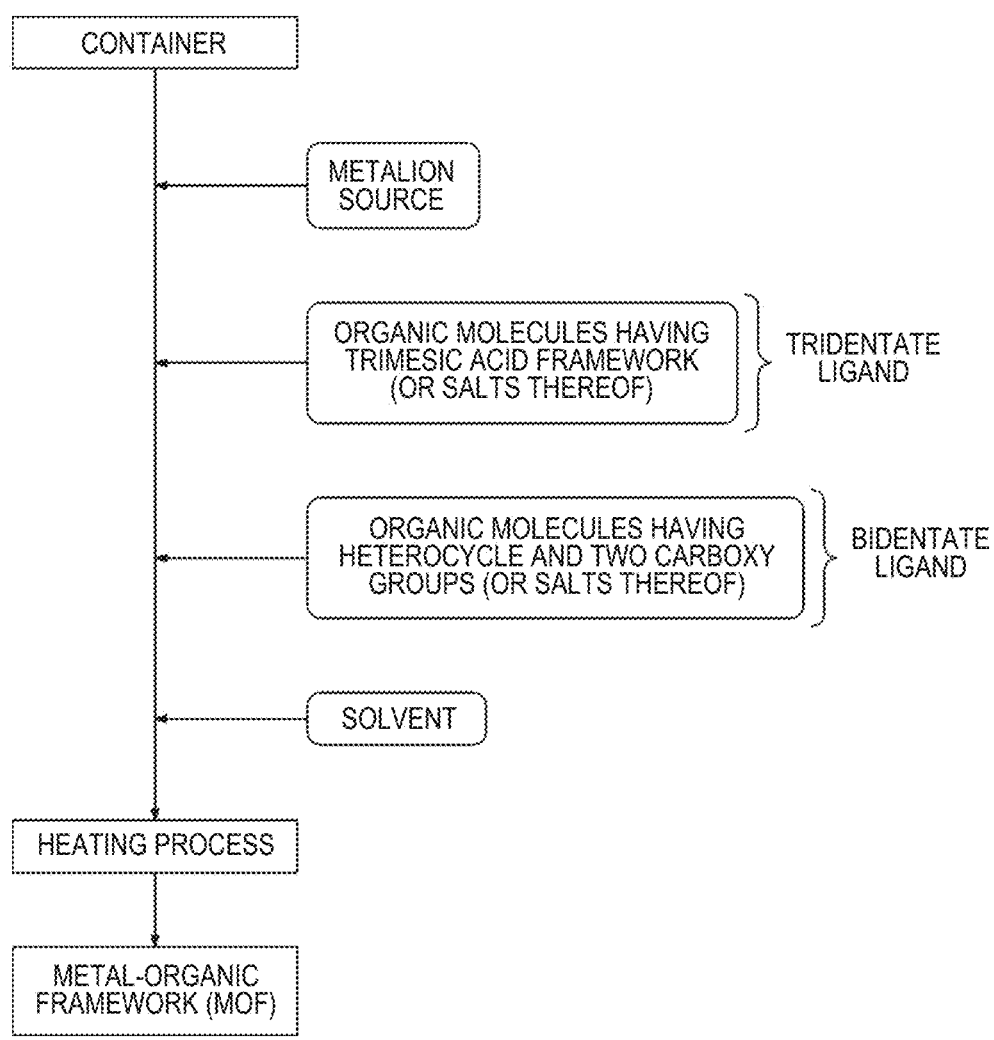
FIG. 10 is a flowchart showing an example of a method of producing an MOF according to the present disclosure.

FIG. 10 is a diagram conceptually showing an example of a production method of the present disclosure. In the production method shown in FIG. 10, a process (heating process) of heating a solution obtained by putting a metal ion source, organic molecules having a trimesic acid framework or salts thereof, organic molecules having a heterocycle and two carboxy groups or salts thereof, and a solvent into a container is performed to produce an MOF.

2.1. Metal Ion Source

The metal ion source used in the production method of the present disclosure is not particularly limited as long as it is possible to supply metal ions constituting the MOF of the present disclosure described above. For example, when the above metal ions are at least one selected from the group consisting of Zr$^{4+}$, Hf$^{4+}$ and Ce$^{4+}$, at least one selected from the group consisting of known zirconium compounds, hafnium compounds and cerium compounds can be a metal ion source. Among these, in consideration of ease of availability and the like, a zirconium compound is preferable. Examples of the zirconium compound include zirconium oxychloride octahydrate (ZrOCl$_2$.8H$_2$O) and/or zirconium chloride (ZrCl$_4$).

2.2. Organic Molecules having a Trimesic Acid Framework

Organic molecules having a trimesic acid framework mean, for example, organic molecules having a structure represented by the above General Formula (2).

Examples of salts of organic molecules having a trimesic acid framework include potassium salts, sodium salts, lithium salts, ammonium salts, and acid anhydrides of the organic molecules having a trimesic acid framework described above.

2.3. Organic Molecules having a Heterocycle and Two Carboxy Groups

Organic molecules having a heterocycle and two carboxy groups refer to, for example, organic molecules having a structure represented by General Formula (1) described above.

Preferably, the organic molecules having a heterocycle and two carboxy groups do not have a functional group having a pKa (acid dissociation constant) smaller than that of a carboxy group of the organic molecules. This is because, when organic molecules having a heterocycle and two carboxy groups have a functional group having a pKa smaller than that of a carboxy group of the organic molecules, ions have a charge of −3 or less, and as described above, charge compensation is not necessary, and defect introduction does not occur. Examples of the functional group having a pKa smaller than that of a carboxy group of the organic molecule include a sulfo group, a sulfene group, a phosphine group, and phosphone.

Examples of salts of organic molecules having a heterocycle and two carboxy groups include potassium salts, sodium salts, lithium salts, ammonium salts, and acid anhydrides of the organic molecules having a heterocycle and two carboxy groups described above.

Here, in the case of ions of organic molecules having a heterocycle and two carboxy groups in which carboxyl groups in General Formula (1) are disposed at ortho positions or para positions, both are bidentate ligands in which two carboxyl groups are bonded to a heterocycle. However, ions of the organic molecule when an angle between two carboxyl groups is 60° or ions of the organic molecule when an angle between two carboxyl groups is 180° cannot be directly replaced with ions of the organic molecule when an angle between three carboxyl groups is 120°, which is thought to cause collapse of a crystal structure.

2.4. Solvent

The metal ion source, organic molecules having a heterocycle and two carboxy groups or salts thereof, and organic molecules having a trimesic acid framework or salts thereof described above can be dispersed in the solvent used in the production method of the present disclosure. The solvent is not particularly limited as long as it can allow synthesis of an MOF in the heating process to be described. However, in consideration of promoting synthesis of an MOF, an amide and a carboxylic acid are preferably used.

2.4.1. Amide

Examples of the amide used in the production method of the present disclosure include N,N-dimethylformamide (DMF) and/or N,N-diethylformamide (DEF).

2.4.2. Carboxylic Acid

In the production method of the present disclosure, when a carboxylic acid is used as a solvent, ions of the carboxylic acid function as monodentate ligands, the number of multidentate ligands coordinated to a metal cluster is reduced, and it is easy to form a crystal structure of the MOF of the present disclosure. The carboxylic acid used in the production method of the present disclosure is not particularly limited as long as it can supply ions of carboxylic acids that function as monodentate ligands of the MOF of the present disclosure described above. For example, a monovalent linear saturated aliphatic carboxylic acid having 1 to 3 carbon atoms may be used. Among these, at least one selected from the group consisting of formic acid, acetic acid and propanoic acid is preferable, and formic acid and/or acetic acid is more preferable.

2.5. Heating Process

The heating process is a process of heating a solution containing the metal ion source described above, organic molecules having a heterocycle and two carboxy groups or salts thereof, organic molecules having an isophthalic acid framework or salts thereof, and a solvent.

A heating temperature in the heating process is not limited as long as it is a temperature at which an MOF can be generated, and is preferably 100° C. to 150° C. At 100° C. to 150° C., the reactivity of a reagent improves and an MOF is likely to be generated. Furthermore, since an increase in the vapor pressure can be reduced, it is possible to reduce vapor leakage from the container. In addition, a heating time in the heating process is preferably 6 hours or more. This is because the reactivity of the reagent improves after 6 hours or more.

Here, the metal-organic framework of the present disclosure can be used for an adsorption heat pump that uses adsorption heat, a dehumidification system, a heat storage system that uses adsorption heat, an air conditioner that uses vaporization heat, and the like.

[Synthesis of Metal-Organic Framework (MOF)]

Metal-organic frameworks (MOFs) according to Examples 1 to 10 and Comparative Examples 1 to 11 were synthesized using the following reagents.

—Reagents—

Zirconium oxychloride octahydrate ($ZrOCl_2 \cdot 8H_2O$, commercially available from Sigma-Aldrich)

Trimesic acid ($H_3BTC$, commercially available from Sigma-Aldrich)

3,5-Pyridinedicarboxylic acid (3,5-$H_2PyDC$, commercially available from Tokyo Chemical Industry Co., Ltd.)

2,4-Pyridinedicarboxylic acid (2,4-$H_2PyDC$, commercially available from Tokyo Chemical Industry Co., Ltd.)

Isophthalic acid (m-$H_2BDC$, commercially available from Tokyo Chemical Industry Co., Ltd.)

Chelidamic acid monohydrate (4-hydroxypyridine-2,6-dicarboxylic acid monohydrate, commercially available from Tokyo Chemical Industry Co., Ltd.)

Chelidonic acid monohydrate (4-oxo-4H pyran-2,6-dicarboxylic acid monohydrate, commercially available from Tokyo Chemical Industry Co., Ltd.)

Acetic acid (commercially available from FUJIFILM Wako Pure Chemical Corporation)

N,N-dimethylformamide (DMF, commercially available from FUJIFILM Wako Pure Chemical Corporation)

EXAMPLE 1

(1) Here, 387 mg (120 mmol) of zirconium oxychloride octahydrate ($ZrOCl_2 \cdot 8H_2O$), 76 mg (36 mmol) of trimesic acid ($H_3BTC$), 7 mg (4 mmol) of 3,5-pyridinedicarboxylic acid (3,5-$H_2PyDC$), 20 mL of acetic acid, and 20 mL of N,N-dimethylformamide (DMF) were put into a 100 ml PTFE container (HUT-100, commercially available from SAN-AI Kagaku Co. Ltd.).

Figure 11:
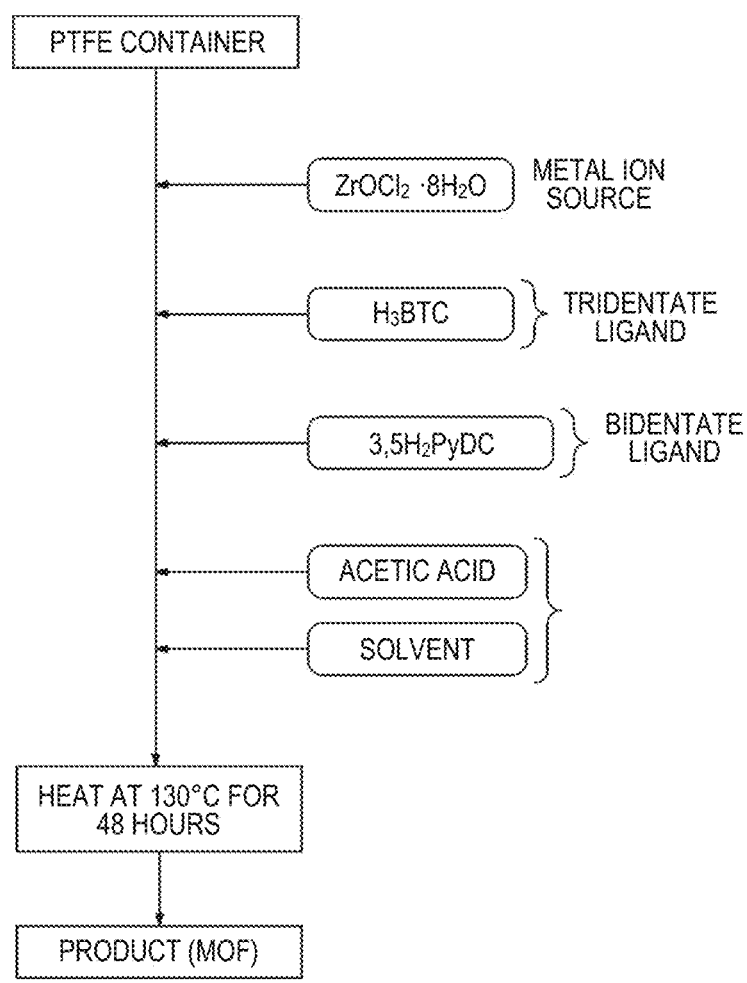
FIG. 11 is a flowchart showing a method of producing an MOF according to Example 1.

(2) The PTFE container was put into an outer cylinder made of pressure resistant stainless steel (HUS-100, commercially available from SAN-AI Kagaku Co. Ltd.) and heated at 130° C. for 48 hours. (3) The product was filtered off, and washed three times with 10 mL of DMF, washed three times with 10 mL of acetone (commercially available from FUJIFILM Wako Pure Chemical Corporation), and then heated at 60° C. overnight and dried while reducing a pressure to $10^{-1}$ Pa or less, and thereby a product (an MOF according to Example 1) was obtained. FIG. 11 shows a flowchart of the production method of Example 1.

EXAMPLE 2

(1) An MOF according to Example 2 was obtained in the same manner as in Example 1 except that 67 mg (32 mmol) of trimesic acid ($H_3BTC$) and 13 mg (8 mmol) of 3,5-pyridinedicarboxylic acid (3,5-$H_2PyDC$) were used.

EXAMPLE 3

(1) An MOF according to Example 3 was obtained in the same manner as in Example 1 except that 59 mg (28 mmol) of trimesic acid ($H_3BTC$) and 20 mg (12 mmol) of 3,5-pyridinedicarboxylic acid (3,5-$H_2PyDC$) were used.

EXAMPLE 4

(1) An MOF according to Example 4 was obtained in the same manner as in Example 1 except that 50 mg (24 mmol) of trimesic acid ($H_3BTC$) and 27 mg (16 mmol) of 3,5-pyridinedicarboxylic acid (3,5-$H_2PyDC$) were used.

EXAMPLE 5

(1) An MOF according to Example 5 was obtained in the same manner as in Example 1 except that 42 mg (20 mmol) of trimesic acid ($H_3BTC$) and 33 mg (20 mmol) of 3,5-pyridinedicarboxylic acid (3,5-$H_2PyDC$) were used.

EXAMPLE 6

(1) An MOF according to Example 6 was obtained in the same manner as in Example 1 except that 34 mg (16 mmol) of trimesic acid ($H_3BTC$) and 40 mg (24 mmol) of 3,5-pyridinedicarboxylic acid (3,5-$H_2PyDC$) were used.

EXAMPLE 7

(1) An MOF according to Example 7 was obtained in the same manner as in Example 1 except that 25 mg (12 mmol)

of trimesic acid ($H_3BTC$) and 47 mg (28 mmol) of 3,5-pyridinedicarboxylic acid (3,5-$H_2PyDC$) were used.

EXAMPLE 8

(1) An MOF according to Example 8 was obtained in the same manner as in Example 1 except that 7 mg (4 mmol) of 3,5-pyridinedicarboxylic acid (3,5-$H_2PyDC$) was replaced with 7 mg (4 mmol) of 2,4-pyridinedicarboxylic acid (2,4-$H_2PyDC$).

EXAMPLE 9

(1) An MOF according to Example 9 was obtained in the same manner as in Example 1 except that 7 mg (4 mmol) of 3,5-pyridinedicarboxylic acid (3,5-$H_2PyDC$) was replaced with 8 mg (4 mmol) of chelidamic acid monohydrate (4-hydroxypyridine-2,6-dicarboxylic acid monohydrate).

EXAMPLE 10

(1) An MOF according to Example 10 was obtained in the same manner as in Example 1 except that 7 mg (4 mmol) of 3,5-pyridinedicarboxylic acid (3,5-$H_2PyDC$) was replaced with 8 mg (4 mmol) of chelidonic acid monohydrate (4-oxo-4H pyran-2,6-dicarboxylic acid monohydrate).

COMPARATIVE EXAMPLE 1

(1) An MOF according to Comparative Example 1 was obtained in the same manner as in Example 1 except that 84 mg (40 mmol) of trimesic acid ($H_3BTC$) and 0 mg (0 mmol) of 3,5-pyridinedicarboxylic acid (3,5-$H_2PyDC$) were used.

COMPARATIVE EXAMPLE 2

(1) An MOF according to Comparative Example 2 was obtained in the same manner as in Example 1 except that 7 mg (4 mmol) of 3,5-pyridinedicarboxylic acid (3,5-$H_2PyDC$) was replaced with 7 mg (4 mmol) of isophthalic acid (m-$H_2BDC$).

COMPARATIVE EXAMPLE 3

(1) An MOF according to Comparative Example 3 was obtained in the same manner as in Comparative Example 2 except that 67 mg (32 mmol) of trimesic acid ($H_3BTC$) and 13 mg (8 mmol) of isophthalic acid (m-$H_2BDC$) were used.

COMPARTIVE EXAMPLE 4

(1) An MOF according to Comparative Example 4 was obtained in the same manner as in Comparative Example 2 except that 59 mg (28 mmol) of trimesic acid ($H_3BTC$) and 20 mg (12 mmol) of isophthalic acid (m-$H_2BDC$) were used.

COMPARATIVE EXAMPLE 5

(1) An MOF according to Comparative Example 5 was obtained in the same manner as in Comparative Example 2 except that 50 mg (24 mmol) of trimesic acid ($H_3BTC$) and 27 mg (16 mmol) of isophthalic acid (m-$H_2BDC$) were used.

COMPARATIVE EXAMPLE 6

(1) An MOF according to Comparative Example 6 was obtained in the same manner as in Comparative Example 2 except that 42 mg (20 mmol) of trimesic acid ($H_3BTC$) and 33 mg (20 mmol) of isophthalic acid (m-$H_2BDC$) were used.

COMPARATIVE EXAMPLE 7

(1) An MOF according to Comparative Example 7 was obtained in the same manner as in Example 1 except that 17 mg (8 mmol) of trimesic acid ($H_3BTC$) and 53 mg (32 mmol) of 3,5-pyridinedicarboxylic acid (3,5-$H_2PyDC$) were used.

COMPARATIVE EXAMPLE 8

(1) An MOF according to Comparative Example 8 was obtained in the same manner as in Example 1 except that 8 mg (4 mmol) of trimesic acid ($H_3BTC$) and 60 mg (36 mmol) of 3,5-pyridinedicarboxylic acid (3,5-$H_2PyDC$) were used.

COMPARATIVE EXAMPLE 9

(1) An MOF according to Comparative Example 9 was obtained in the same manner as in Example 8 except that 42 mg (20 mmol) of trimesic acid ($H_3BTC$) and 33 mg (20 mmol) of 2,4-pyridinedicarboxylic acid (2,4-$H_2PyDC$) were used.

COMPARATIVE EXAMPLE 10

(1) An MOF according to Comparative Example 10 was obtained in the same manner as in Example 9 except that 42 mg (20 mmol) of trimesic acid ($H_3BTC$) was replaced with 40 mg (20 mmol) of chelidamic acid monohydrate (4-hydroxypyridine-2,6-dicarboxylic acid monohydrate).

COMPARATIVE EXAMPLE 11

(1) An MOF according to Comparative Example 11 was obtained in the same manner as in Example 10 except that 42 mg (20 mmol) of trimesic acid ($H_3BTC$) and 40 mg (20 mmol) of chelidonic acid monohydrate (4-oxo-4H pyran-2,6-dicarboxylic acid monohydrate) were used.

[Measurement Items]

(1) X-Ray Diffraction Measurement (Confirmation of Crystal Structure)

X-ray diffractions of the MOFs according to Examples 1 to 10 and Comparative Examples 1 to 11 were measured. A measurement device and measurement conditions are as follows.

Measurement device: RINTRAPIDII (commercially available from Rigaku Corporation)

Measurement conditions: a voltage of 50 V, a current of 100 mA, a collimator diameter of φ0.3, and a sample angle of ω15°

Figure 12:
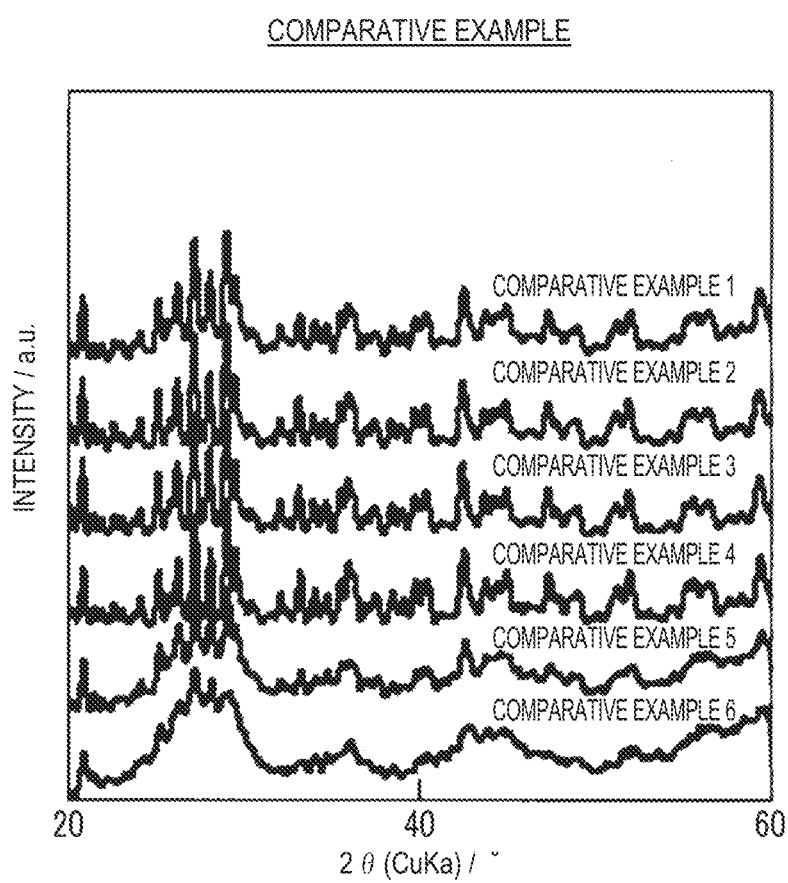
FIG. 12 is an X-ray diffraction pattern of MOFs according to Comparative Examples 1 to 6.
Figure 13:
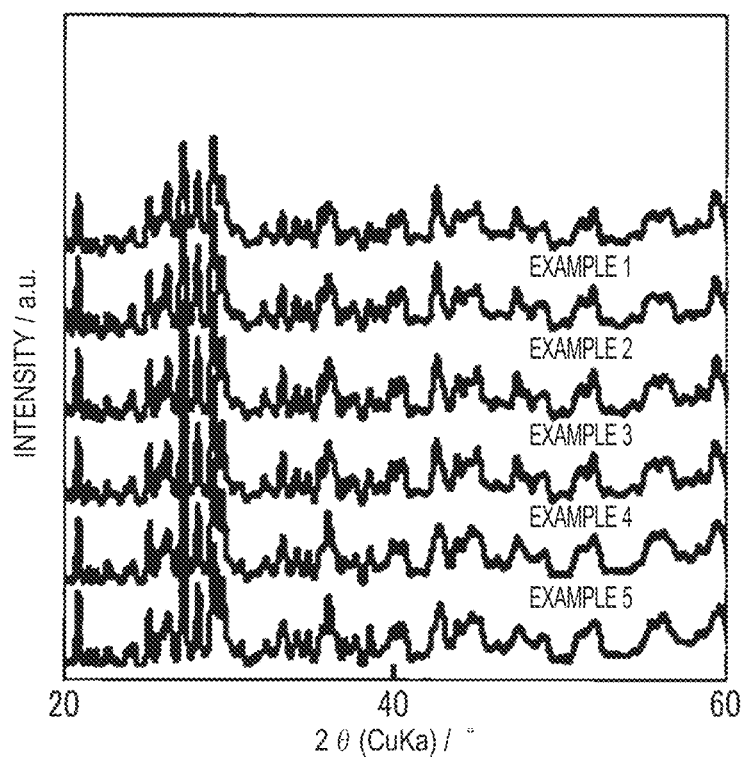
FIG. 13 is an X-ray diffraction pattern of MOFs according to Comparative Example 1 and Examples 1 to 5.
Figure 14:
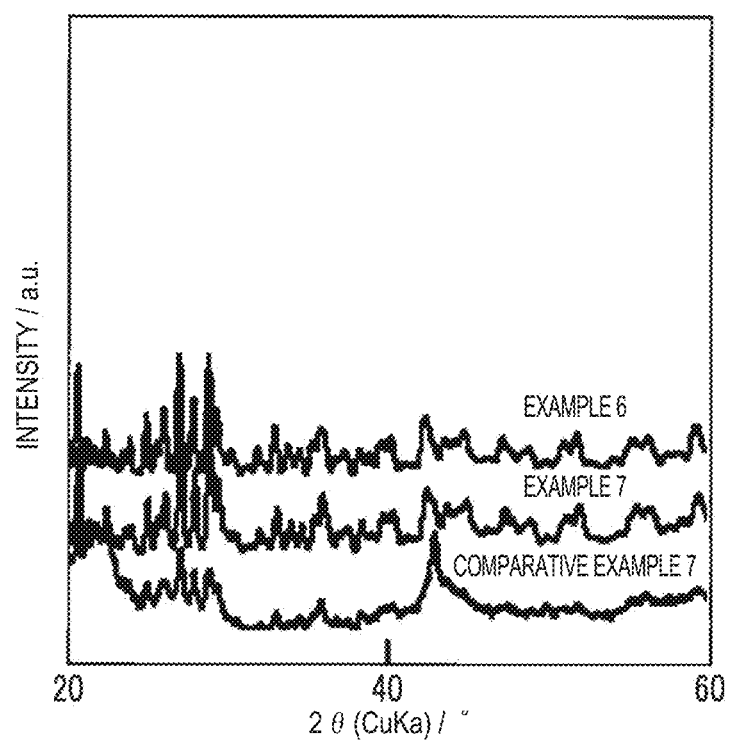
FIG. 14 is an X-ray diffraction pattern of MOFs according to Comparative Example 7 and Examples 6 and 7.
Figure 15:
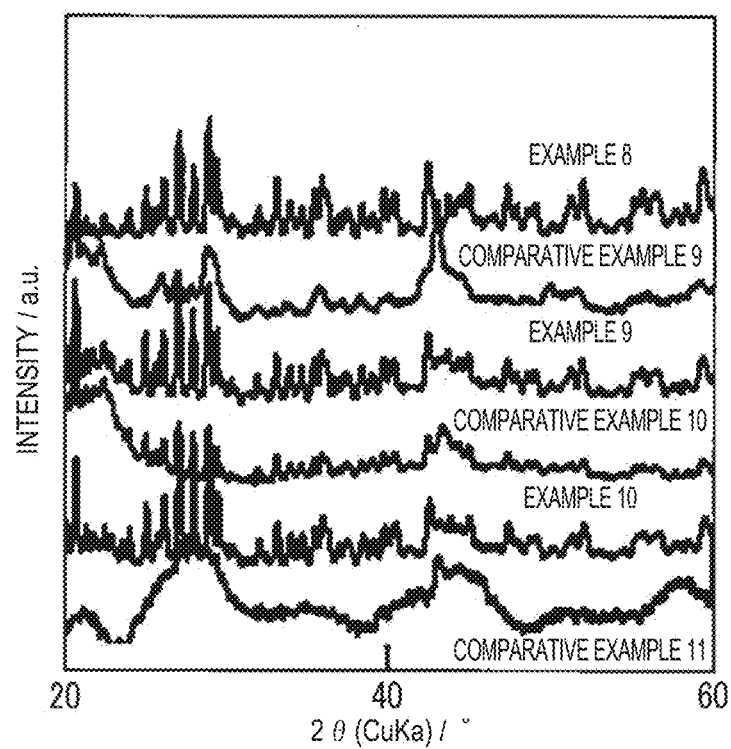
FIG. 15 is an X-ray diffraction pattern of MOFs according to Comparative Examples 9 to 11 and Examples 8 to 10.
Figure 16:
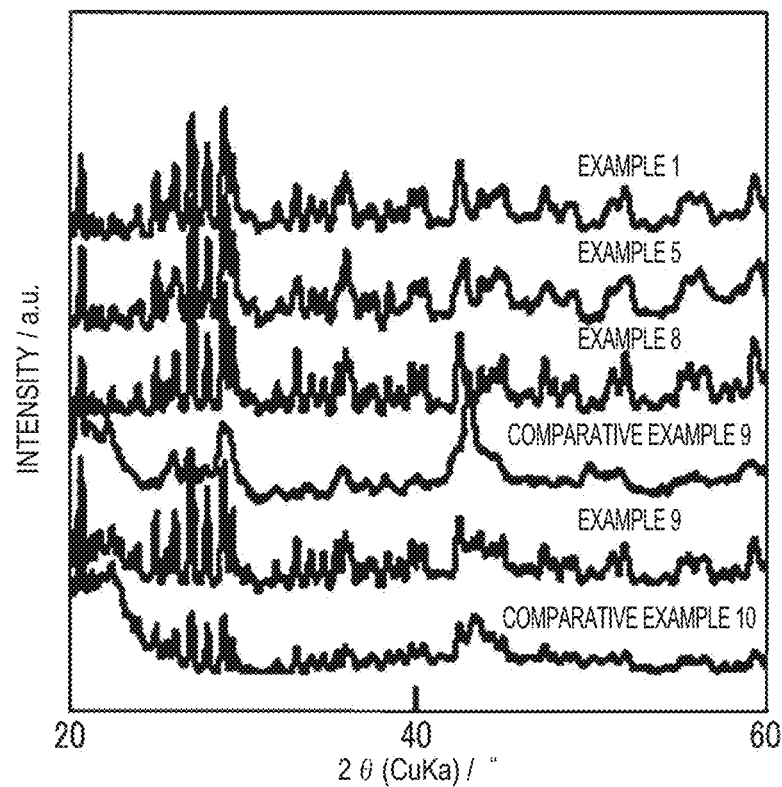
FIG. 16 is an X-ray diffraction pattern of MOFs according to Comparative Examples 9 and 10 and Examples 1, 5, 8 and 9.

The measurement results of Comparative Examples 1 to 6 are shown in FIG. 12. The measurement results of Comparative Example 1 and Examples 1 to 5 are shown in FIG. 13. The measurement results of Examples 6 and 7, and Comparative Example 7 are shown in FIG. 14. The measurement results of Examples 8 to 10 and Comparative Examples 9 to 11 are shown in FIG. 15. The measurement results of Comparative Examples 9 and 10 and Examples 1, 5, 8 and 9 are shown in FIG. 16.

(2) $^1$H-NMR Measurement (Composition Analysis of MOF)

Products (MOFs according to Examples 3 and 5 and Comparative Examples 4 and 6) were decomposed, and $^1$H-NMR spectrums of the solution were then measured, and a proportion of ligands included in the MOF was obtained from the integrated proportion. Decomposition conditions, a measurement device, and measurement conditions are as follows.

Decomposition conditions: about 10 mg of a product (MOF) was decomposed with 1 mL of bisulfate ($D_2SO_4$)

Measurement device: JNM-AL400 (commercially available from JEOL Ltd.)

Measurement conditions: $^1$H-NMR spectrums of the solution were measured using Tetramethylsilane (TMS) as an internal reference, and types and proportions of ligands included in the MOFs according to Examples 3 and 5 and Comparative Examples 4 and 6 are shown in Table 1.

TABLE 1

Type of bidentate ligands, and addition amount and substitution amount

| | Ligand added | Addition amount/mol % | Substitution amount/mol % |
|---|---|---|---|
| Example 3 | 3,5-$H_2$PyDC | 30 | 11.1 |
| Example 5 | 3,5-$H_2$PyDC | 50 | 18.3 |
| Comparative Example 4 | m-$H_2$BDC | 30 | 5.3 |
| Comparative Example 6 | m-$H_2$BDC | 50 | 9.0 |

(3) Measurement of Water Vapor Adsorption and Desorption (Evaluation of Water Vapor Adsorption and Desorption Characteristics)

The MOFs according to Examples 1 to 5, and 8 to 10, and Comparative Examples 1 to 6 were subjected to a pretreatment, and water vapor adsorption and desorption isothermal curves were then measured, and a water vapor adsorption amount at a relative humidity of 20% to 40% was obtained.

Pretreatment device: BELPREP-vacII (commercially available from MicrotracBEL Corp.)

Pretreatment conditions: degree of vacuum<$10^{-2}$ Pa, heating at 130° C. for 6 hours, and measurement device: BELSORP-max (commercially available from MicrotracBEL Corp.)

Measurement conditions: a water vapor adsorption amount was measured at a temperature of 20° C., and a relative humidity of 0% to 85%.

Figure 17:
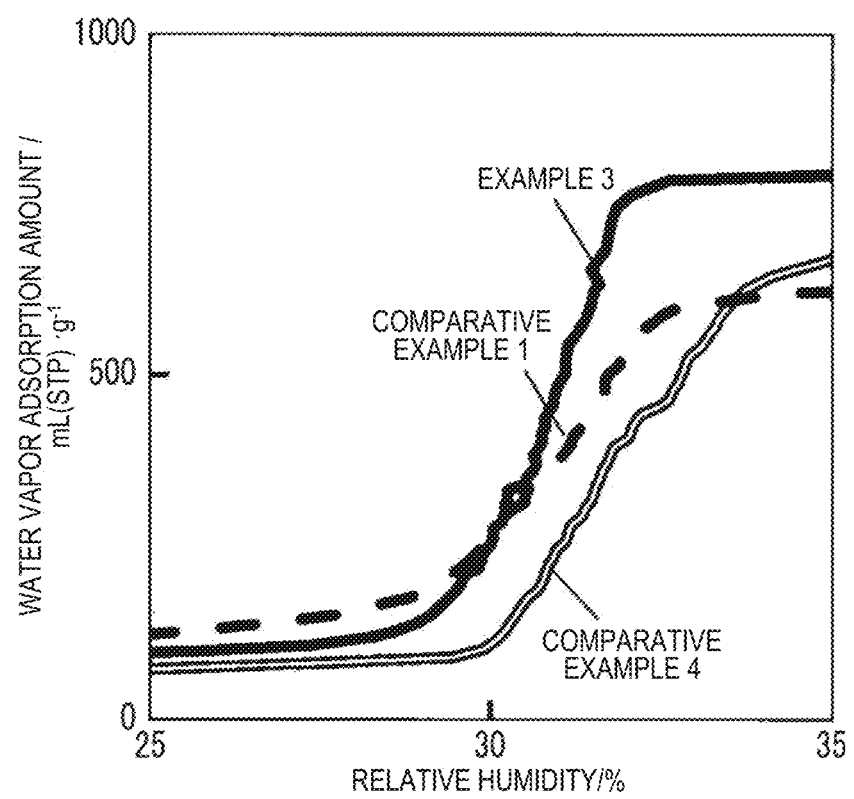
FIG. 17 is a diagram showing water vapor adsorption and desorption isotherms of MOFs according to Example 3, Comparative Example 1, and Comparative Example 4.

FIG. 17 shows water vapor adsorption and desorption curves of the MOFs according to Example 3 and Comparative Examples 1 and 4 at 20° C. In addition, Table 2 shows water vapor adsorption amounts of the MOFs according to Examples 1 to 5, and 8 to 10 and Comparative Examples 1 to 6.

TABLE 2

Type of bidentate ligands, and addition amount and water vapor adsorption amount

| | Ligand added | Addition amount/mol % | Water vapor adsorption amount mL (STP) · $g^{-1}$ |
|---|---|---|---|
| Comparative Example 1 | — | — | 549 |
| Example 1 | 3,5-$H_2$PyDC | 10 | 649 |
| Example 2 | 3,5-$H_2$PyDC | 20 | 653 |
| Example 3 | 3,5-$H_2$PyDC | 30 | 736 |
| Example 4 | 3,5-$H_2$PyDC | 40 | 693 |
| Example 5 | 3,5-$H_2$PyDC | 50 | 680 |
| Example 8 | 2,4-$H_2$PyDC | 10 | 728 |

TABLE 2-continued

Type of bidentate ligands, and addition amount and water vapor adsorption amount

| | Ligand added | Addition amount/mol % | Water vapor adsorption amount mL (STP) · $g^{-1}$ |
|---|---|---|---|
| Example 9 | Chelidamic acid monohydrate | 10 | 698 |
| Example 10 | Chelidonic acid monohydrate | 10 | 686 |
| Comparative Example 2 | m-$H_2$BDC | 10 | 747 |
| Comparative Example 3 | m-$H_2$BDC | 20 | 665 |
| Comparative Example 4 | m-$H_2$BDC | 30 | 677 |
| Comparative Example 5 | m-$H_2$BDC | 40 | 299 |
| Comparative Example 6 | m-$H_2$BDC | 50 | 195 |

[Results]

(1) X-Ray Diffraction Measurement

As shown in FIG. 12, in Comparative Examples 2 to 4, the same X-ray diffraction patterns as Comparative Example 1 were obtained. On the other hand, in Comparative Examples 5 and 6, the crystallinity was apparently lower than that of Comparative Example 1. This is thought to have been caused by the fact that, when an amount of isophthalic acid (m-$H_2$BDC) added exceeded 40 mol %, an amount of defect increased, and it was difficult to maintain a crystal structure.

As shown in FIG. 13 and FIG. 14, in Examples 1 to 7, the same X-ray diffraction patterns as Comparative Example 1 were obtained. Even in Examples 4 and 5 in which an amount of bidentate ligands added was the same as in Comparative Examples 5 and 6, no decrease in the crystallinity was observed. In addition, even in Examples 6 and 7 in which an amount of bidentate ligands added increased, no decrease in the crystallinity was observed. On the other hand, in Comparative Example 7, the crystallinity was apparently lower than that of Comparative Example 1. This is thought to have been caused by the fact that, when an amount of 3,5-pyridinedicarboxylic acid (3,5-$H_2$PyDC) added exceeded 80 mol %, an amount of defect increased, and it was difficult to maintain a crystal structure.

As shown in FIG. 15, in Comparative Examples 9 to 11 in which an amount of bidentate ligands added was 50 mol %, the crystallinity was lower than those of Examples 8 to 10 in which an amount of bidentate ligands added was 10 mol %. This is thought to have been caused by the fact that, when an amount of bidentate ligands added exceeded 50 mol %, an amount of defect increased, and it was difficult to maintain a crystal structure.

As shown in FIG. 16, in Examples 1, 8 and 9 in which an amount of bidentate ligands added was 10 mol %, no decrease in the crystallinity was observed. When an amount of bidentate ligand added was 50 mol, in Comparative Examples 9 and 10 in which 2,4-pyridinedicarboxylic acid (2,4-$H_2$PyDC) and chelidamic acid were added, diffraction peaks became broad, and the crystallinity was lower than those of Examples 8 and 9. This is thought to have been caused by the fact that, when an amount of bidentate ligands added exceeded 50 mol %, an amount of defect increased, and it was difficult to maintain a crystal structure. In addition, like 2,4-$H_2$PyDC and chelidamic acid, it is thought that, since atoms (hydrogen atoms in the case of 2,4-$H_2$PyDC, and oxygen atoms in the case of chelidamic acid) extending in a direction opposite to an aromatic ring or a heterocycle from carbon atoms were present at meta positions when viewed form carboxy groups, the steric hindrance occurred between atoms extending from carbon atoms and hydroxy groups or water molecules present on the surface of metal clusters, and a crystal structure was destabilized. On the other hand, in Example 5 in which 50 mol % of 3,5-pyridinedicarboxylic acid (3,5-$H_2$PyDC) was added, no decrease in the crystallinity was observed. It is thought that this is because, since nitrogen atoms as heteroatoms were present at meta positions when viewed from carboxy groups like 3,5-$H_2$PyDC, there were no atoms extending in a direction opposite to an aromatic ring or a heterocycle from heteroatoms, and the steric hindrance with hydroxy groups or water molecules present on the surface of metal clusters was small, and destabilization of the crystal structure was reduced.

(2) $^1$H-NMR Measurement

As shown in Table 1, in Examples 3 and 5, it was confirmed that trimesic acid ions ($BTC^{3-}$, tridentate ligand) were substituted with ions of organic molecules having a heterocycle and two carboxy groups (3,5-$H_2$PyDC$^{2-}$, bidentate ligand). In addition, it was confirmed that, in Example 5 and Comparative Example 6, amounts of bidentate ligands added were the same, but a substitution amount in Example 5 was larger than that of Comparative Example 6, and as compared with FIG. 12 and FIG. 13, in Comparative Example 6, a substitution amount was 9%, and the crystallinity was lowered, but in Example 5, even if a substitution amount exceeded 18%, the crystallinity did not decrease. Accordingly, it is thought that, when ions of organic molecules having a heterocycle and two carboxy groups were used, the stability of the MOF with respect to a substitution amount of the same bidentate ligand was improved.

(3) Measurement of Water Vapor Adsorption and Desorption

As shown in FIG. 17, in Example 3, a water vapor adsorption amount increased compared to Comparative Example 1, but there was almost no change in the relative humidity. On the other hand, in Comparative Example 4, a water vapor adsorption amount increased compared to Comparative Example 1, but the relative humidity changed to the high humidity side. Here, the relative humidity in the present disclosure is a value indicating a ratio of a water vapor amount contained in air to a saturated water vapor amount of the air at a certain temperature.

When the relative humidity at which the water vapor adsorption amount reaches half is set as an adsorption humidity, the adsorption humidity of Comparative Example 1 and Example 3 was 30.8%. On the other hand, in Comparative Example 4, the adsorption humidity was 31.7% and the adsorption humidity increased compared to Comparative Example 1.

This is because, in Comparative Example 4, since an interaction with water molecules was weak, and bidentate ligands having a hydrophobic benzene ring were present on the surface of pores, it is thought that water molecules were not easily attracted to the benzene ring and the adsorption humidity increased. On the other hand, in Example 3, bidentate ligands having a heterocycle that form hydrogen bonds with water molecules were present on the surface of pores. Therefore, it is thought that water molecules were attracted to the heterocycle, and it was possible to reduce an increase in the adsorption humidity.

Figure 18:
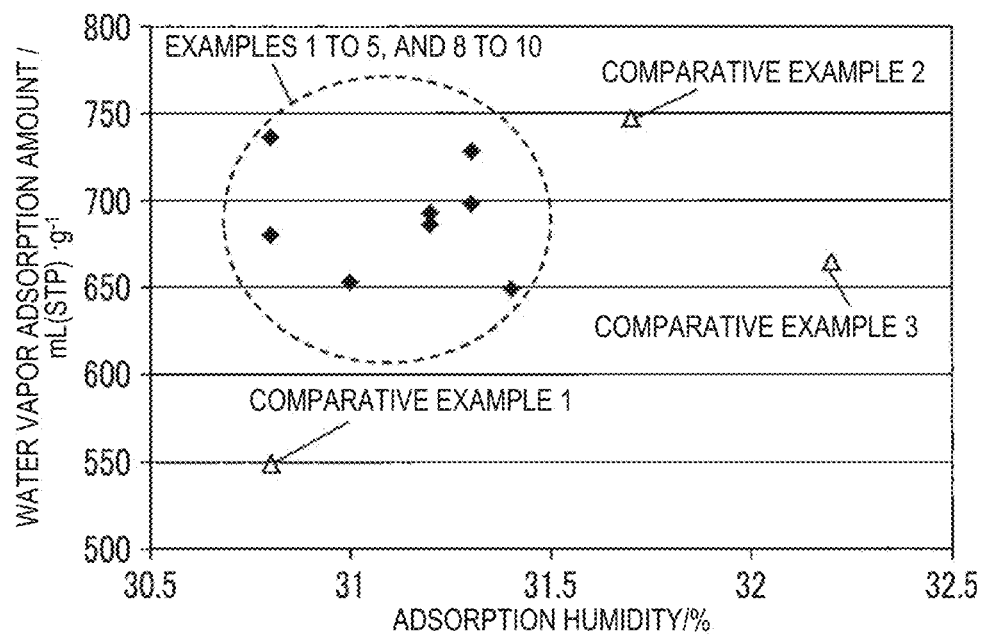
FIG. 18 is a diagram showing the relationship between an adsorption humidity and a water vapor adsorption amount of MOFs according to Examples 1 to 5, and 8 to 10 and Comparative Examples 1 to 3.

A graph in which the relative humidity at which the water vapor adsorption amount reached half was set as an adsorption humidity and water vapor adsorption amounts in a relative humidity range of 20% to 40% were plotted with respect to the adsorption humidity is shown in FIG. 18. As shown in FIG. 18, it was confirmed that, in Comparative Examples 1 to 3, when an amount of bidentate ligands added increased, the adsorption humidity changed to the high humidity side. On the other hand, it was confirmed that, in Examples 1 to 5, and 8 to 10, compared to Comparative Examples 1 to 3, the change of the adsorption humidity to the high humidity side was small.

Figure 19:
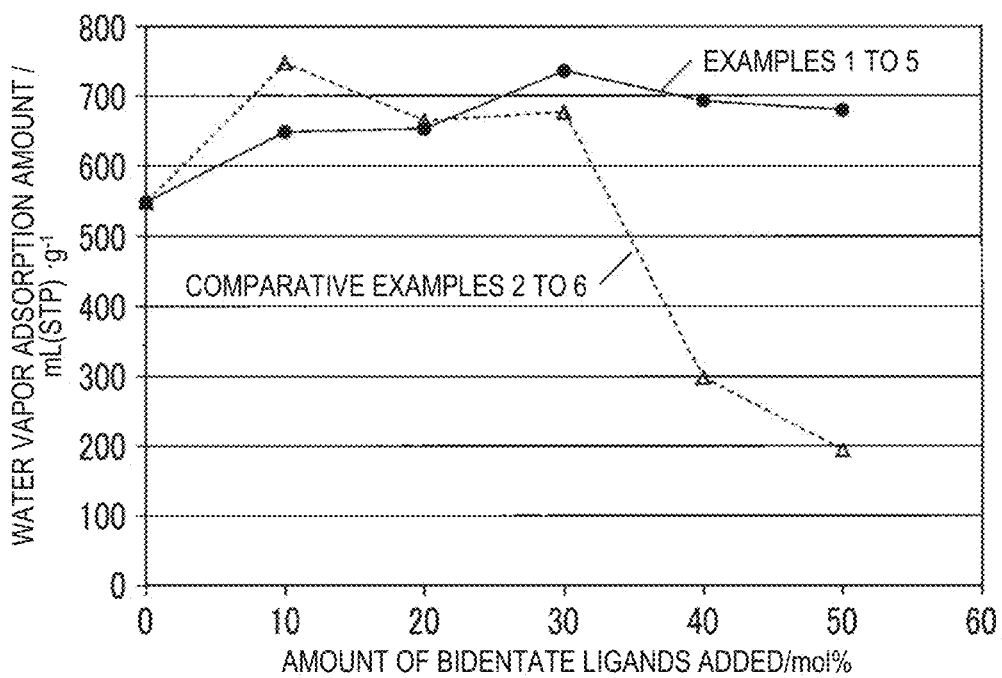
FIG. 19 is a diagram showing the relationship between an amount of a bidentate ligand added and a water vapor adsorption amount of MOFs according to Examples 1 to 5 and Comparative Examples 1 to 6.

FIG. 19 shows the relationship between an amount of bidentate ligands added in the MOF in which 10 mol % to 50 mol % of isophthalic acid (m-$H_2$BDC) or 3,5-pyridinedicarboxylic acid (3,5-$H_2$PyDC) was added and a water vapor adsorption amount with respect to Comparative Example 1 in which no bidentate ligands were substituted. In Comparative Example 2-6 in which m-$H_2$BDC was added, it was observed that, when an amount of m-$H_2$BDC added increased, the water vapor adsorption amount tended to decrease.

On the other hand, it was confirmed that, in Example 1-5 in which 3,5-$H_2$PyDC was added, even if an amount of 3,5-$H_2$PyDC added increased, a decrease in the water vapor adsorption amount was reduced compared to a case in which m-$H_2$BDC was added. This is thought to have been caused by the fact that, in the case of 3,5-$H_2$PyDC, since there were no atoms extending in a direction opposite to an aromatic ring from nitrogen atoms at meta positions when viewed from carboxy groups, the steric hindrance with hydroxy groups or water molecules present on the surface of metal clusters was small and destabilization of the crystal structure was reduced. Therefore, it is thought that, even if an amount of bidentate ligand added increased, it was possible to maintain a crystal structure of the MOF and reduce a decrease in the water vapor adsorption amount.

Here, while a case in which $Zr^{4+}$ was used as a metal ion has been described in the above examples, the metal ion is not limited to $Zr^{4+}$. As described above, when ions of organic molecules having a heterocycle and two carboxy groups were used as bidentate ligands, the water vapor adsorption amount increased while the water vapor adsorption humidity was reduced. Therefore, metal ions may be selected according to an ionic radius, ease of availability, and the like.

In addition, while a case in which organic molecules having a trimesic acid framework having no substituent R were used has been described in the above example, organic molecules having a trimesic acid framework are not limited to the organic molecules described above. As described above, when ions of organic molecules having a heterocycle and two carboxy groups were used as bidentate ligands, the water vapor adsorption amount increased while the water vapor adsorption humidity was reduced. Therefore, organic molecules having a trimesic acid framework that can form an MOF may be selected.

What is claimed is:

1. A metal-organic framework comprising:
   $Zr^{4+}$ as metal ions;
   trimesic acid ions; and
   second ions of organic molecules having a heterocycle and two carboxy groups as bidentate ligands,
   wherein the bidentate ligands are at least one selected from the group consisting of 3,5-pyridinedicarboxylic acid ions, 2,4-pyridinedicarboxylic acid ions, 4-hydroxypyridine-2,6-dicarboxylic acid ions, and 4-oxo-4H pyran-2,6-dicarboxylic acid ions.

2. The metal-organic framework according to claim 1, wherein the bidentate ligands are 3,5-pyridinedicarboxylic acid ions.

3. A method of producing the metal-organic framework of claim 1, the method comprising:
heating a solution containing a zirconium compound, trimesic acid, second organic molecules or second salts selected from the group consisting of 3,5-pyridinedicarboxylic acid ions, 2,4-pyridinedicarboxylic acid ions, 4-hydroxypyridine-2,6-dicarboxylic acid ions, and 4-oxo-4H pyran-2,6-dicarboxylic acid ions, and a solvent.

4. The method according to claim 3, wherein the zirconium compound includes zirconium oxychloride octahydrate or zirconium chloride.

5. The method according to claim 3, wherein the second organic molecules or the second salts are 3,5-pyridinedicarboxylic acid ions.

6. The method according to claim 3, wherein a proportion of the second organic molecules or the second salts with respect to a total amount of the first organic molecules or the first salts and the second organic molecules or the second salts is 70 mol% or less.

7. The method according to claim 3, wherein the solvent includes an amide and a carboxylic acid.

8. The method according to claim 7, wherein the amide includes N,N-dimethylformamide or N,N-diethylformamide.

9. The method according to claim 7, wherein the carboxylic acid is a monovalent linear saturated aliphatic carboxylic acid having one to three carbon atoms.

10. The method according to claim 7, wherein the carboxylic acid includes formic acid or acetic acid.

* * * * *